United States Patent
Wallis et al.

(10) Patent No.: US 10,061,930 B2
(45) Date of Patent: Aug. 28, 2018

(54) STRONG CONFIRMATION MECHANISM FOR MANIPULATION OF SENSITIVE CONFIGURATION DATA

(71) Applicant: INTERNATIONAL BUSINESS MACHINES CORPORATION, Armonk, NY (US)

(72) Inventors: Robert J. Wallis, Stockport (GB); James D. Whitaker, Manchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2 days.

(21) Appl. No.: 15/234,322

(22) Filed: Aug. 11, 2016

(65) Prior Publication Data
US 2018/0046813 A1 Feb. 15, 2018

(51) Int. Cl.
| G06F 21/60 | (2013.01) |
| G06F 17/30 | (2006.01) |
| H04L 29/08 | (2006.01) |
| G06F 3/0481 | (2013.01) |
| G06F 3/0482 | (2013.01) |
| G06F 3/0484 | (2013.01) |

(52) U.S. Cl.
CPC ........ *G06F 21/606* (2013.01); *G06F 3/04817* (2013.01); *G06F 17/303* (2013.01); *H04L 67/1097* (2013.01); *G06F 3/0482* (2013.01); *G06F 3/04842* (2013.01)

(58) Field of Classification Search
CPC .. G06F 21/606; G06F 17/303; G06F 3/04817; G06F 3/04842; G06F 3/0482; H04L 67/1097
See application file for complete search history.

(56) References Cited

U.S. PATENT DOCUMENTS

| 6,199,102 B1 * | 3/2001 | Cobb ...................... H04L 51/12 |
| | | 709/202 |
| 6,345,318 B1 | 2/2002 | Gamon |
| 8,938,626 B2 | 1/2015 | Jaber et al. |
| 9,201,610 B2 | 12/2015 | Wofford, IV et al. |
| 9,235,721 B2 | 1/2016 | Ericsson et al. |
| 2012/0011192 A1 | 1/2012 | Meister et al. |
| 2014/0248852 A1 * | 9/2014 | Raleigh ............... H04M 15/723 |
| | | 455/407 |

OTHER PUBLICATIONS

StackExchange, "What are some alternatives to the phrase "Are you sure you want to XYZ" in confirmation dialogs?" Dec. 8, 2011, date access Sep. 30, 2017, pp. 1-7, https://web.archive.org/web/20111208183523/https://ux.stackexchange.com/questions/756/what-are-some-alternatives-to-the-phrase-are-you-sure-you-want-to-xyz-in-confi.*

(Continued)

*Primary Examiner* — Jung W Kim
*Assistant Examiner* — Carlos M De Jesus Lassala
(74) *Attorney, Agent, or Firm* — Griffiths & Seaton PLLC

(57) ABSTRACT

An intention to perform a data management function in a computing environment is confirmed by issuing a confirmation prompt requiring a user to input at least one character associated with a subject of the data management function prior to performing the data management function.

6 Claims, 5 Drawing Sheets

(56) References Cited

OTHER PUBLICATIONS

Andrew Coyle, "Designing Confirmation" Nov. 2016, date obtained: Apr. 2018, pp. 1-5, https://medium.com/flexport-design/designing-confirmation-278d159723e (Year: 2016).*

"Using Oracle Storage Cloud Service: Deleting Objects," Oracle, https://docs.oracle.com/cloud/latest/storagece_common/CSSTO/GUID-C05CB081-2DBC-485C-AB86-7B980CFC2062.htm#CSSTO3249, 2016 (4 pages).

"Object Versioning Cloud Storage—Google Cloud Platform," https://cloud.google.com/storage/docs/object-versioning, Dec. 21, 2015 (11 pages).

List of IBM Patents or Patent Applications Treated as Related dated Aug. 12, 2016 (2 pages).

* cited by examiner

STRONG CONFIRMATION MECHANISM FOR MANIPULATION OF SENSITIVE CONFIGURATION DATA

BACKGROUND OF THE INVENTION

Field of the Invention

The present invention relates in general to computing systems, and more particularly to various embodiments for managing data security in computing environments.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. These computer systems may also include virtual storage components. Storage infrastructure management teams are often tasked with the day-to-day management and configuration of these data storage systems.

SUMMARY OF THE INVENTION

Various embodiments for managing data security in a computing environment, by a processor device, are provided. In one embodiment, a method comprises confirming an intention to perform a data management function by issuing a confirmation prompt requiring a user to input at least one character associated with a subject of the data management function prior to performing the data management function.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
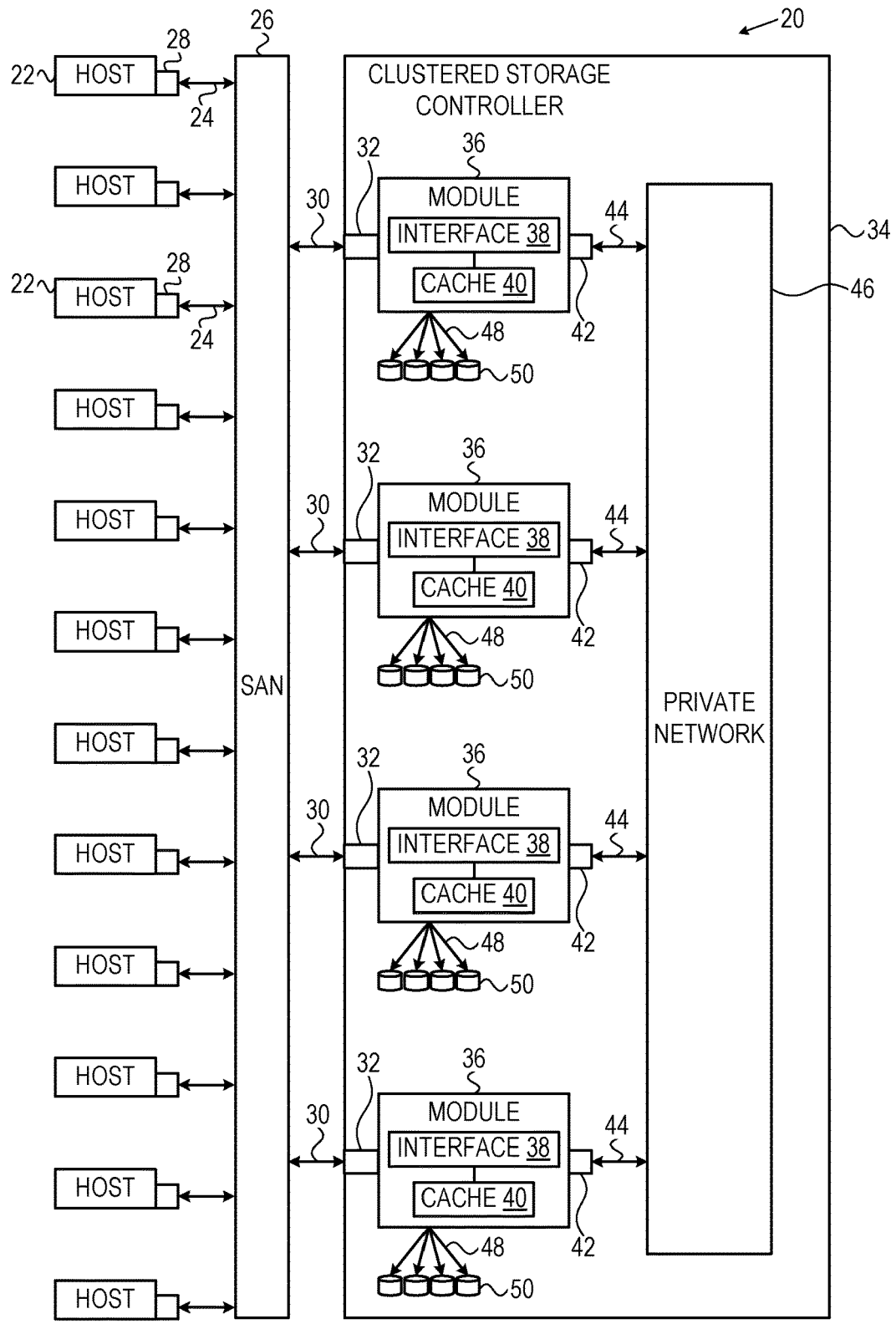
FIG. 1 is a block diagram illustrating a computer storage environment in which aspects of the present invention may be realized.

Described embodiments, and illustrative Figures of various embodiments for an additional flowchart illustrating a method for managing data security in a computing environment, in accordance with aspects of the present invention are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

As aforementioned, in computing storage environments, storage infrastructure management teams are tasked with managing storage arrays, network configuration, and other management functions dealing with various pieces of equipment in their day-to-day jobs. This work is typically performed using a command line interface (CLI) or graphical user interface (GUI), in which tasks are logically arranged and objects are arranged in a tabular manner.

Much of this work to be performed consists of data management functions such as creating new storage disks, configuring new host data objects, and deleting obsolete data objects that are no longer in use in the storage environment. When deleting data objects, standard practice is to issue a prompt asking the user for confirmation in order to prevent accidental clicks, thereby inadvertently deleting data or otherwise causing damage to a system. Accidental mistakes can cause the permanent loss of essential data with no recovery path options, so there is a well-known guiding principle of error prevention that interface designers should follow, giving users the best chances of preventing mistakes to occur.

It is important to note that throughout the disclosure, the term "data management function" is widely used for simplicity and clarity. In an actual implementation, a data management function may comprise of storage management functions such as the aforementioned administrative jobs of creating new storage data or data disks, configuring new host data or data objects, and deleting obsolete data or data objects that are no longer in use in the storage environment. In addition, a data management function may comprise the migration of data or data objects, renaming of data or data objects, and a host of related management functions a storage administrator is tasked with in a routine undertaking as one of ordinary skill in the art. Furthermore, the mechanisms provided herein may be advantageous to a wide range of sensitive data management commands which require a confirmation that the user issue an intent with the system in order to complete and thereby perform the command. As previously discussed, the mechanisms provided by the present invention are described herein with particular regard to a computing storage environment, however this description and the examples provided therein should not be construed to be limiting in scope and spirit while staying within the bounds of the disclosure.

Some well-known solutions for confirming action prior to performing these functions include:

1) A confirmation prompt wherein the user is given an additional "are you sure you want to continue?" textual prompt requiring a "yes/no" answer button before performing the management function. This mechanism has the drawback of being extremely prevalent in the field, so a user can anticipate the prompt and easily click "yes" without actually thinking about their choice or reviewing their action (i.e. the user is not required to return back to review data names/locations/etc. of data files they have requested to delete, or otherwise manipulate). In some instances, the location of the "yes" and "no" buttons may be flipped from a standard position, however, still, this functionality does not require the user to review the action of the function they have requested to perform;

2) A password prompt having an additional dialog box which prompts for the user's administrative password. This acts as a longer confirmation method than clicking yes/no in a dialog box, however is so widely prevalent in the IT administration field, the user may anticipate the prompt and hastily enter their password thereby bypassing any options to review the action of the function they have requested to perform;

3) A confirmation prompt requiring a user to type the word "yes" in a dialog box before performing the management function. However, here again, an experienced user would become accustomed to this practice and eventually anticipate, and possibly hastily confirm the confirmation prompt, thereby bypassing any options to review the action of the function they have requested to perform. In each of the preceding three examples, the abounding issue is muscle memory. An experienced user performing many storage management tasks daily easily becomes accustomed to an anticipated confirmation prompt and may inadvertently click through the prompt without reviewing the action they have requested to perform; and 4) A confirmation prompt wherein the user is requested to type the number of objects being deleted/modified into the dialog box. This is a significant improvement over the above, because it forces the user to actually go back to their selections and count the number of items selected. This implies that they will check object/data names, however does not enforce it.

In view of the foregoing, the mechanisms of the illustrated embodiments provide various solutions to managing data security in computing environments. These mechanisms include such functionality as prompting a user to enter single alphanumeric characters from a selection of data/object names to confirm an administrative action, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
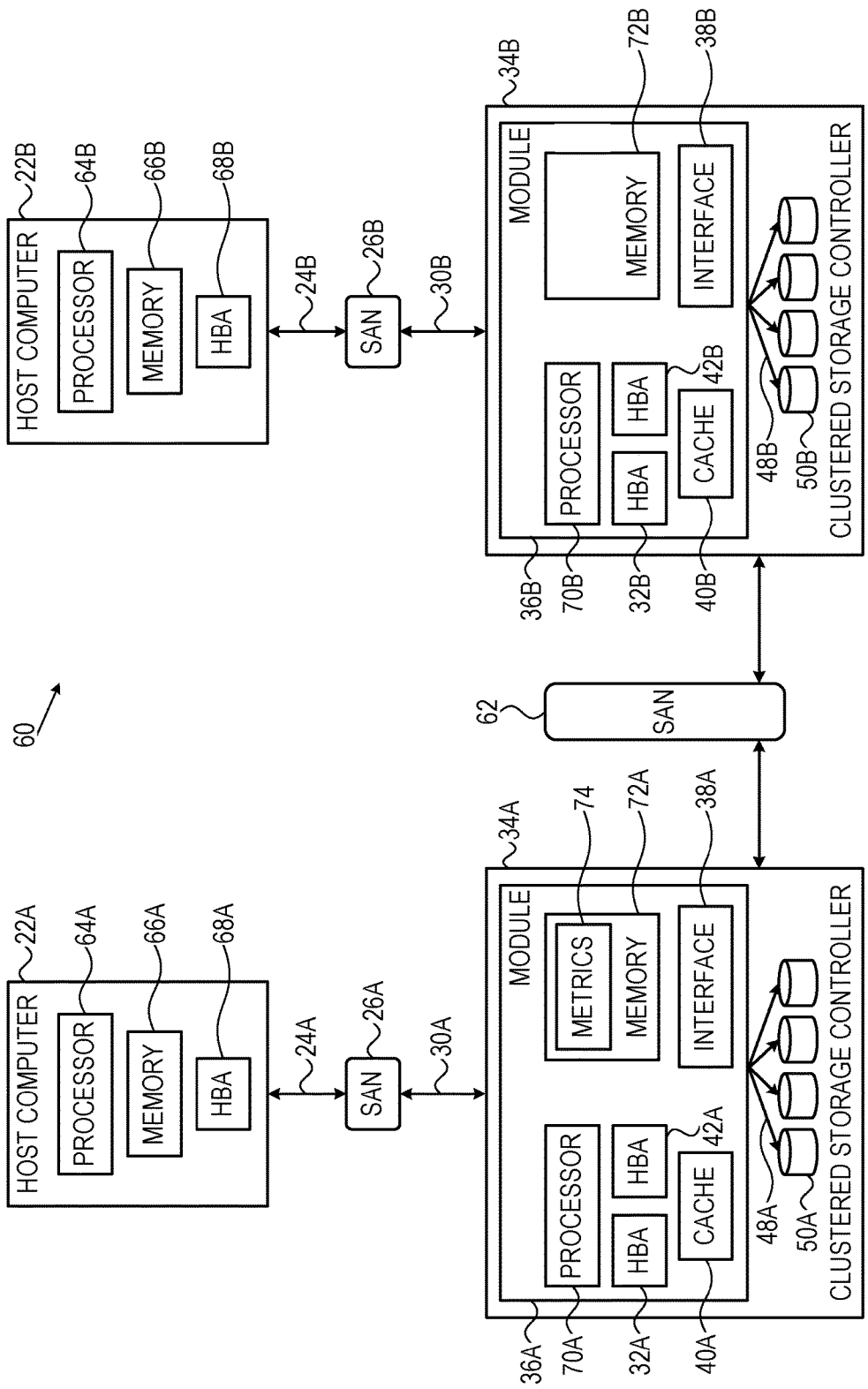
FIG. 2 is a block diagram illustrating a hardware structure of an exemplary data storage system in a computer system, in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters, serial attached SCSI (SAS), and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
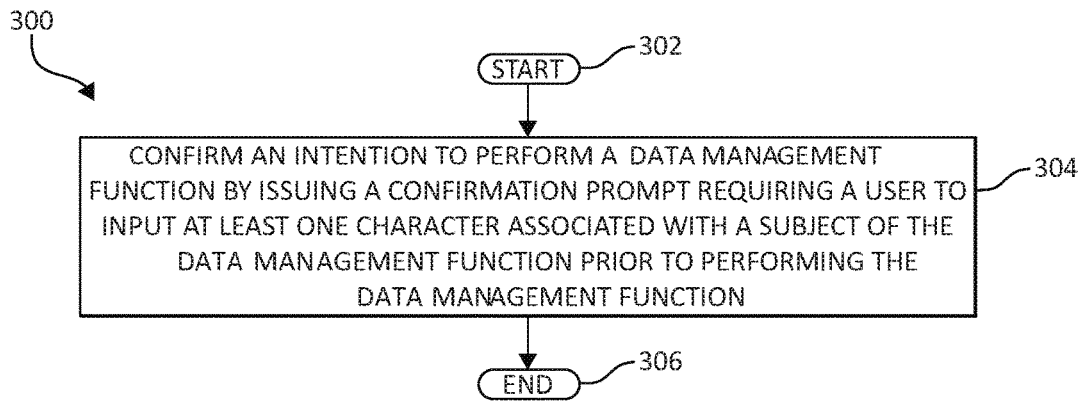
FIG. 3 is a flowchart illustrating a method for managing data security in a computing environment, in accordance with aspects of the present invention.

Continuing to FIG. 3, a method 300 for managing data security in a computing environment, is illustrated, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 302, an intention to perform a data management function is confirmed by issuing a confirmation prompt requiring a user to input at least one character associated with a subject of the data management function prior to performing the data management function (step 304). The method ends (step 306).

The present invention provides a two-fold mechanism to ensure data security in computing environments. A first aspect includes the strong confirmation method as aforementioned, in which upon a command to perform a data management function (i.e. delete/create/configure data in storage environments), a confirmation prompt is issued which requires a user to enter single alphanumeric characters from a selection of data names, in similar fashion to obfuscated passwords. This negates the aspect of muscle memory or simply bypassing an anticipated confirmation prompt, while also requiring the user to refer back to the subjects (i.e. data names) associated with the requested data management function. A second aspect of the present invention includes a decision engine based upon a complexity algorithm for calculating a difficulty or complexity of the issued confirmation prompt, as will be described.

Strong Confirmation

Figure 4:
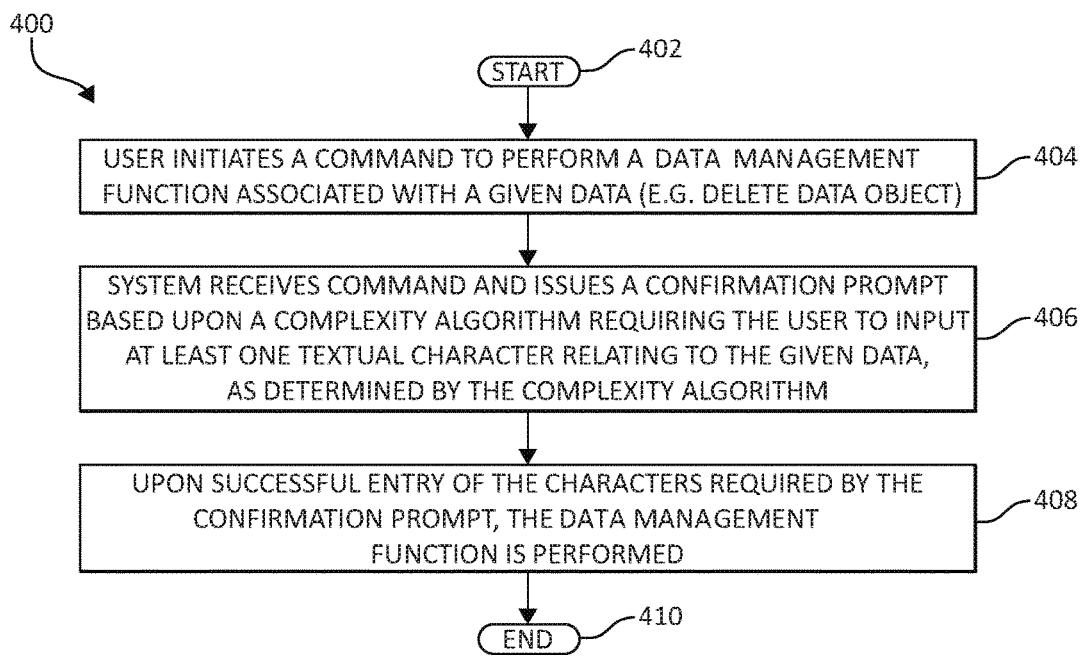
FIG. 4 is an additional flowchart illustrating a method for managing data security in a computing environment, in accordance with aspects of the present invention.

Advancing to FIG. 4, a method 400 for strong confirmation of data management functions, is illustrated, in accordance with one embodiment of the present invention. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Beginning (step 402), a user (e.g. storage administrator) initiates a command to perform a data management function associated with a given data or selection of data (step 404). The system receives the command and issues a confirmation prompt as determined by a decision engine and based on a complexity algorithm requiring the user to input at least one textual character relating to the given data, as so determined (step 406). In some embodiments, the character(s) may be an alphanumeric character(s) chosen from within one or more of the data names subject to the data management function. In other embodiments, this may be a number of subject objects as determined by the decision engine. Upon successful entry of the character(s) required by the confirmation prompt, the data management function is then allowed to proceed to be performed by the data system (step 408). The method ends (step 410).

Figure 5:
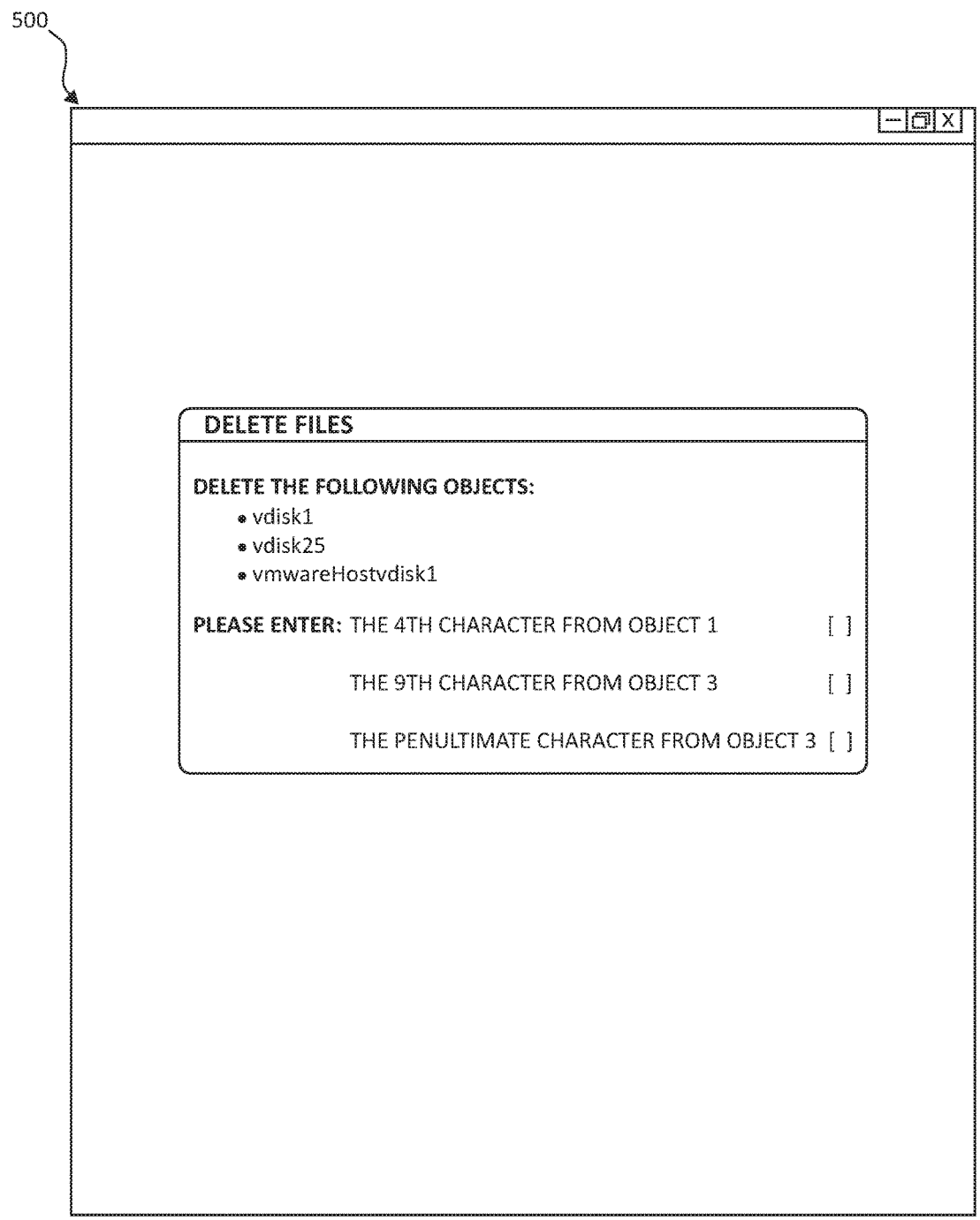
FIG. 5 is confirmation prompt for managing data security in a computing environment, in accordance with aspects of the present invention.

FIG. 5 illustrates a confirmation prompt 500, providing a pictorial example of the functionality expressed in FIG. 3 and FIG. 4. Prompt 500 illustrates a confirmation prompt which may be displayed in response to a user's request to delete certain data objects. In this example, the user is attempting to delete the following selection of data objects:

| | | |
|---|---|---|
| 1. | | vdisk1 |
| 2. | | vdisk25 |
| 3. | | vmwareHostvdisk1 |

Prior to performing the deletion, the user then receives the prompt:

| | | |
|---|---|---|
| Please enter: | The 4th character from object 1 | [ ] |
| | The 9th character from object 3 | [ ] |
| | The penultimate character from object 3 | [ ] |

In this example, upon the successful entry of "s" in the first prompt entry, "s" in the second prompt entry, and again "s" in the third prompt entry, the deletion of the selection of data objects is then allowed to proceed. This mechanism requires the user performing the data management function to scrutinize the subjects of the function thereby increasing the likelihood of avoiding an inadvertent command.

Decision Engine

As previously mentioned, a second aspect of the present invention is a novel decision engine for calculating a complexity or difficulty level of the confirmation prompt required, based upon a complexity algorithm. In one embodiment, the complexity algorithm accounts for a similarity of data being subject to the data management function. For example, if the data object names subject to the data management function are each very different or there are numerous data objects being subject to the data management function, a strong, difficult prompt is used. In another example, if there is one outlying named object the complexity algorithm assures this name is used more heavily in the character entry test. Note that in FIG. 5, the two aforementioned scenarios met both aforementioned example criterion. Two of the three data objects being subject to the data management function had very similar names, while the third data object was out of context when compared with the prior two. For this reason, a difficult prompt was issued wherein object number three was more heavily tested.

Conversely, if the number of data objects subject to the data management function is low, and each of the data objects are similarly named, the prompt may be considered of lower priority by the complexity algorithm and therefore issue a less difficult prompt, potentially even falling back to an entry of the number of subject data objects prompt rather than the character check.

In another embodiment, the complexity algorithm accounts for a user role of the user issuing the command to perform the data management function, such that the user's role may be judged to determine how to vary the difficulty of the prompt. For example, a user role having a lower level of administrative access may be less trusted and therefore be given a more difficult prompt when executing the data management function. For example, in a storage environment, a senior user in a security administration role may be more trusted and therefore be issued a less difficult prompt when performing the same data management function.

In other embodiments, the complexity algorithm accounts for a user experience level of the user issuing the command to perform the data management function, the user expertise level being gauged on one or more metrics, for example:

1) A historical activity metric based on a number of volumes previously deleted/manipulated by the user;
2) A length of service metric associated with a number of days the user's account has been active;
3) A currency of account metric based on how many activities in a predetermined timeframe (e.g. the previous week) were performed on the user's account (which would prevent against a user being "rusty" after a time, then coming back to a previous role);

4) A trust metric associated with how many previous operations have been undone/reversed after the fact (for example, mapping a host to a volume and then unmapping that host later in a given day); and 5) A diligence metric measuring how frequently the user has failed previous validation checks (multiple failed previous validation checks might indicate a user not being diligent enough in researching their confirmation prompt subjects and therefore trusted less).

Based upon one or more of the foregoing metrics, the complexity algorithm makes a determination of the strength and difficulty of the confirmation prompt issued when a data management function is requested. Of course, one of ordinary skill in the art would widely recognize that additional or fewer metrics may be used to make this determination.

Figure 6:
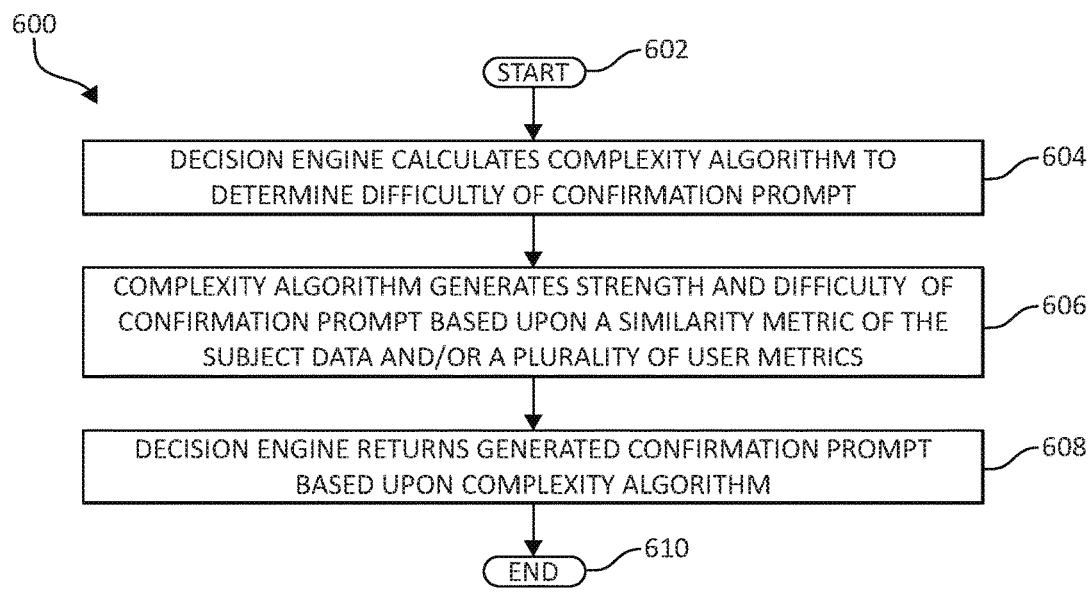
FIG. 6 is still an additional flowchart illustrating a method for managing data security in a computing environment, in accordance with aspects of the present invention.

Concluding, FIG. 6 illustrates a method 600 for calculating confirmation prompt complexity, in accordance with one embodiment of the present invention. The method 600 may be performed in accordance with the present invention in any of the environments depicted in FIGS. 1-2, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Beginning (step 602), once a request to perform a data management function is received by a user, a decision engine uses a complexity algorithm to determine a strength and difficulty of the confirmation prompt (step 604). The complexity algorithm generates the strength and difficulty of the required confirmation prompt based on a similarity metric of the subject data of the data management function and/or a plurality of user metrics comprising a user role or experience level (step 606). The decision engine returns the generated confirmation prompt based upon the complexity algorithm for the user to complete (step 608). Upon successful completion of the generated confirmation prompt, the system performs the requested data management function. The method ends (step 610).

It should be appreciated that, again, while the mechanisms of the present invention have been described in detail relating to data management corresponding to storage administrative functionality, the functionality provided herein may be applied to a wide range of applications where the handling of sensitive data is paramount.

For example, in some embodiments, the mechanisms of the present invention may be applied to an e-mail client for handling sensitive information between recipients. For example, when sending an e-mail containing confidential information and/or marked as such, the recipients thereto may be scanned by the e-mail client to detect any anomalies, such as a recipient located in another country, or a recipient outside of a company intranet. Upon this detection, the decision engine may be used to generate a confirmation prompt requiring a specific alphanumeric character associated from within the detected recipient's name and/or e-mail address. These and other embodiments may supply related advantages.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data security in a computing environment, by a processor device, comprising:
   determining, by a decision engine, a complexity strength of a confirmation prompt used to confirm an intention to perform a data management function by a user, the complexity strength comprising an intricacy of a required input response by the user based upon a complexity algorithm; wherein the complexity algorithm accounts for a similarity of at least one data name subject to the data management function when compared to an alternative data name subject to the data management function;
   confirming the intention to perform the data management function by issuing the confirmation prompt requiring the user to input at least one character associated with a subject of the data management function prior to performing the data management function so as to mitigate the performing of the data management function inadvertently on unintended data, the data management function including at least one of a data deletion command and a data migration command; wherein the at least one character associated with the subject of the data management function further includes at least one chosen alphanumeric character of the at least one data name subject to the data management function; and
   upon successful completion of the input of the at least one character associated with the subject of the data management function of the intricacy according to the complexity strength, performing the data management function.

2. The method of claim 1, wherein the complexity algorithm accounts for at least one of a user role and a user experience level of the user issuing the intention to perform the data management function.

3. A system for managing data security in a computing environment, the system comprising:
   at least one processor device, wherein the at least one processor device:
      determines, by a decision engine, a complexity strength of a confirmation prompt used to confirm an intention to perform a data management function by a user, the complexity strength comprising an intricacy of a required input response by the user based upon a complexity algorithm; wherein the complexity algorithm accounts for a similarity of at least one data name subject to the data management function when compared to an alternative data name subject to the data management function;
      confirms the intention to perform the data management function by issuing the confirmation prompt requiring the user to input at least one character associated with a subject of the data management function prior to performing the data management function so as to mitigate the performing of the data management function inadvertently on unintended data, the data management function including at least one of a data deletion command and a data migration command; wherein the at least one character associated with the subject of the data management function further includes at least one chosen alphanumeric character of the at least one data name subject to the data management function; and upon successful completion of the input of the at least one character associated with the subject of the data management function of the intricacy according to the complexity strength, performs the data management function.

4. The system of claim 3, wherein the complexity algorithm accounts for at least one of a user role and a user experience level of the user issuing the intention to perform the data management function.

5. A computer program product for managing data security in a computing environment by at least one processor device, the computer program product embodied on a non-transitory computer-readable storage medium having computer-readable program code portions stored therein, the computer-readable program code portions comprising:

an executable portion that determines, by a decision engine, a complexity strength of a confirmation prompt used to confirm an intention to perform a data management function by a user, the complexity strength comprising an intricacy of a required input response by the user based upon a complexity algorithm; wherein the complexity algorithm accounts for a similarity of at least one data name subject to the data management function when compared to an alternative data name subject to the data management function;

an executable portion that confirms the intention to perform the data management function by issuing the confirmation prompt requiring the user to input at least one character associated with a subject of the data management function prior to performing the data management function so as to mitigate the performing of the data management function inadvertently on unintended data, the data management function including at least one of a data deletion command and a data migration command; wherein the at least one character associated with the subject of the data management function further includes at least one chosen alphanumeric character of the at least one data name subject to the data management function; and an executable portion that, upon successful completion of the input of the at least one character associated with the subject of the data management function of the intricacy according to the complexity strength, performs the data management function.

6. The computer program product of claim 5, wherein the complexity algorithm accounts for at least one of a user role and a user experience level of the user issuing the intention to perform the data management function.

* * * * *